(12) United States Patent
Fujinoi (10) Patent No.: US 10,922,545 B2
(45) Date of Patent: Feb. 16, 2021

(54) INFORMATION PROCESSING DEVICE, INFORMATION PROCESSING METHOD, AND RECORDING MEDIUM

(71) Applicant: NS Solutions Corporation, Tokyo (JP)

(72) Inventor: Ryoma Fujinoi, Tokyo (JP)

(73) Assignee: NS SOLUTIONS CORPORATION, Tokyo (JP)

(*) Notice: Subject to any disclaimer, the term of this patent is extended or adjusted under 35 U.S.C. 154(b) by 0 days.

(21) Appl. No.: 16/330,718

(22) PCT Filed: Mar. 28, 2018

(86) PCT No.: PCT/JP2018/012727
§ 371 (c)(1),
(2) Date: Mar. 5, 2019

(87) PCT Pub. No.: WO2018/186255
PCT Pub. Date: Oct. 11, 2018

(65) Prior Publication Data
US 2020/0042791 A1    Feb. 6, 2020

(30) Foreign Application Priority Data
Apr. 6, 2017    (JP)  .............................. JP2017-075968

(51) Int. Cl.
*G06K 9/00*    (2006.01)
*G06K 7/14*    (2006.01)
(Continued)

(52) U.S. Cl.
CPC ....... *G06K 9/00671* (2013.01); *G06K 7/1413* (2013.01); *G06K 7/1417* (2013.01);
(Continued)

(58) Field of Classification Search
CPC .. G06F 3/011; G06F 3/04842; G06F 16/7837; G06K 9/00671; G06T 19/00
See application file for complete search history.

(56) References Cited

U.S. PATENT DOCUMENTS

| | | |
|---|---|---|
| 9,171,388 B2 | 10/2015 | Morinaga et al. |
| 9,619,868 B2 | 4/2017 | Ohba et al. |

(Continued)

FOREIGN PATENT DOCUMENTS

| | | |
|---|---|---|
| JP | 5-46244 A | 2/1993 |
| JP | 11-331688 A | 11/1999 |

(Continued)

OTHER PUBLICATIONS

International Search Report and Written Opinion, issued by International Searchig Authority in corresponding International Application No. PCT/JP2018/012727, dated Jun. 26, 2018, (PCT/ISA/210 & PCT/ISA/237).

(Continued)

*Primary Examiner* — Xiao M Wu
*Assistant Examiner* — Scott E Sonners
(74) *Attorney, Agent, or Firm* — Arent Fox LLP (57) ABSTRACT

An information processing device of the present invention includes a first determiner and a recognizer. The first determiner is configured to determine a shutter speed and an ISO speed meeting a condition that an exposure value corresponding to a default F-number, a luminance of a subject, the shutter speed, and the ISO speed becomes a predetermined exposure value. The recognizer is configured to recognize a target object from a photographed image. The photographed image is photographed using the default F-number, and the shutter speed and the ISO speed determined by the first determiner.

18 Claims, 4 Drawing Sheets

(51) Int. Cl.
*G06T 11/00* (2006.01)
*H04N 5/235* (2006.01)
*H04N 5/232* (2006.01)
*G02B 27/01* (2006.01)

(52) U.S. Cl.
CPC .......... *G06T 11/00* (2013.01); *H04N 5/2351* (2013.01); *H04N 5/2352* (2013.01); *H04N 5/23218* (2018.08); *G02B 27/0172* (2013.01); *G02B 2027/014* (2013.01); *G02B 2027/0138* (2013.01); *G02B 2027/0178* (2013.01)

(56) References Cited

U.S. PATENT DOCUMENTS

| | | | |
|---|---|---|---|
| 2013/0201217 A1 | 8/2013 | Morinaga et al. | |
| 2015/0192774 A1 | 7/2015 | Watanabe et al. | |
| 2015/0339805 A1* | 11/2015 | Ohba | G06K 9/6201 345/156 |
| 2017/0332009 A1* | 11/2017 | Zhang | H01L 21/0228 |
| 2018/0183986 A1* | 6/2018 | Smith | H04N 5/265 |

FOREIGN PATENT DOCUMENTS

| | | |
|---|---|---|
| JP | 2004-196439 A | 7/2004 |
| JP | 2011-233005 A | 11/2011 |
| JP | 2012-103789 A | 5/2012 |
| JP | 2014-043353 A | 3/2014 |
| JP | 2014-127151 A | 7/2014 |
| JP | 2014122076 A | 7/2014 |
| JP | 2016-128351 A | 7/2016 |

OTHER PUBLICATIONS

International Preliminary Report on Patentability issued from the International Bureau in counterpart International Application No. PCT/JP2018/012727, dated Oct. 17, 2019.

Notice of Reasons for Refusal from the Japanese Patent Office in counterpart application No. 2019-511182, dated Dec. 8, 2020.

* cited by examiner

INFORMATION PROCESSING DEVICE, INFORMATION PROCESSING METHOD, AND RECORDING MEDIUM

CROSS-REFERENCE TO RELATED APPLICATIONS

The present application is a National Stage entry of international Application PCT/JP2018/012727, filed Mar. 28, 2018, which claims priority to Japanese Patent Application No. 2017-075968, filed Apr. 6, 2017, The disclosures of the prior applications are incorporated by reference in their entirety.

TECHNICAL FIELD

The present invention relates to an information processing device, n processing method, and a recording medium.

BACKGROUND ART

There has been conventionally proposed a technique referred to as an augmented reality that recognizes a target object from a photographed image, superimposes an imaginary image corresponding to the target object on the photographed image, and displays the superimposed image. An object display device of Patent Literature 1, an example of a technique related to the augmented reality, includes a control condition determining unit and a display control unit. The control condition determining unit determines whether a control condition defined for each object is met or not. The display control unit performs a display control such that the object is displayed in a second display aspect different from a first display aspect, which is a usual display aspect to display the object, when it is judged that the control condition is met.

CITATION LIST

Patent Literature

Patent Literature 1: Japanese Laid-open Patent Publication No. 2011-233005

SUMMARY OF INVENTION

Technical Problem

However, depending on, for example, a state of a camera and a state of a subject during photographing, the target object cannot be temporarily recognized from the photographed image; therefore, the imaginary image corresponding to the target object possibly fails to be displayed temporarily.

Additionally, in the case where the target object cannot be recognized from the photographed image, it is considered that a process to superimpose the imaginary image on the photographed image and display the superimposed image is continued based on a progress status of the process to superimpose the imaginary image on the photographed image and display the superimposed image. However, in this case, a process based on the photographed image or similar process is required, and this results in an excessive load on a CPU. Accordingly, a response of another process such as a control of causing the imaginary image to follow according to a change in visual field concurrently executed by the identical device possibly delays. The delay in response causes a problem of failing to appropriately display the imaginary image.

An object of the present invention is to prevent a delay in response and ensures stably displaying an imaginary image.

Solution to Problem

An information processing device of the present invention includes a first determiner and a recognizer. The first determiner is configured to determine a shutter speed and an ISO speed meeting a condition that an exposure value corresponding to a default F-number, a luminance of a subject, the shutter speed, and the ISO speed becomes a predetermined exposure value. The recognizer is configured to recognize a target object from a photographed image. The photographed image is photographed using the default F-number, and the shutter speed and the ISO speed determined by the first determiner.

Advantageous Effects of Invention

The present invention prevents a delay in response and ensures stably displaying an imaginary image.

DESCRIPTION OF EMBODIMENTS

Figure 1:
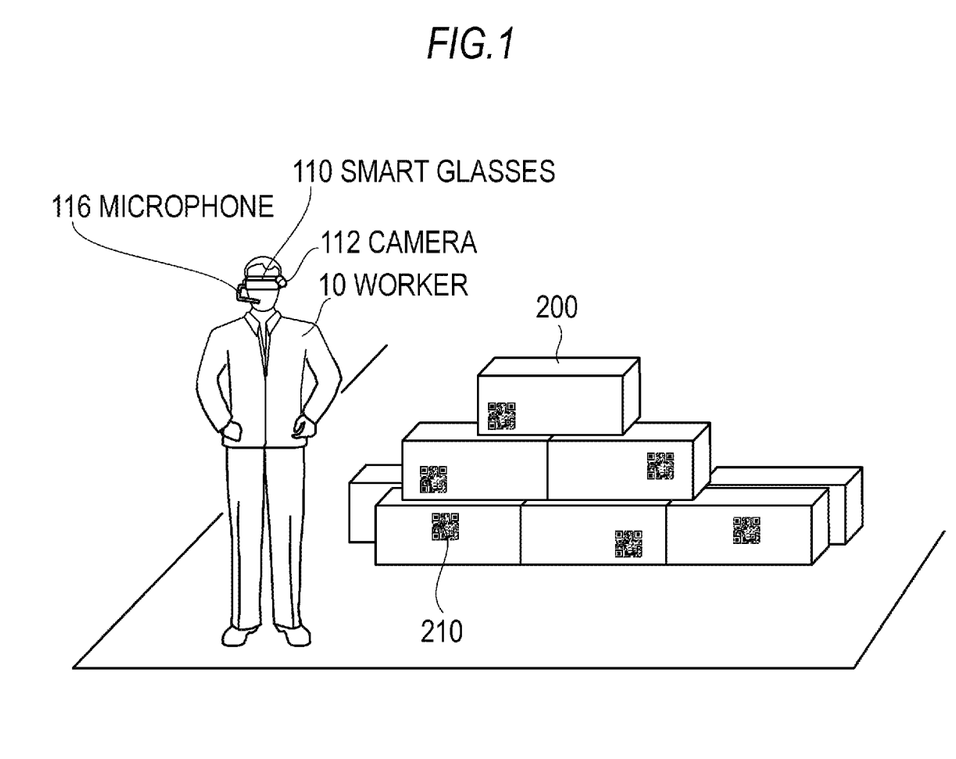
FIG. 1 is a drawing illustrating an example of a usage environment.

[Usage Environment]
First, the following describes an example of a usage environment of an information processing system 100 with reference to FIG. 1. FIG. 1 is a drawing illustrating an example of a usage environment of the information processing system 100.

In this embodiment, the information processing system 100 is used in a warehouse such as a logistics distribution center. The warehouse stores a plurality of articles 200. Markers 210 are attached to the respective articles 200. The marker 210 is an optically readable code that records predetermined information. For example, while a one-dimensional code such as color bits (registered trademark), a QR code (registered trademark), and a barcode is used as the marker 210, another code may be used as the marker 210. The marker 210 records information that can identify the article 200 to which the marker 210 is attached, such as an identification ID of the article 200.

A worker 10 wears smart glasses 110, which constitutes the information processing system 100, to perform picking of the articles 200 and similar work while referring to a superimposition screen 150 described later.

Figure 2:
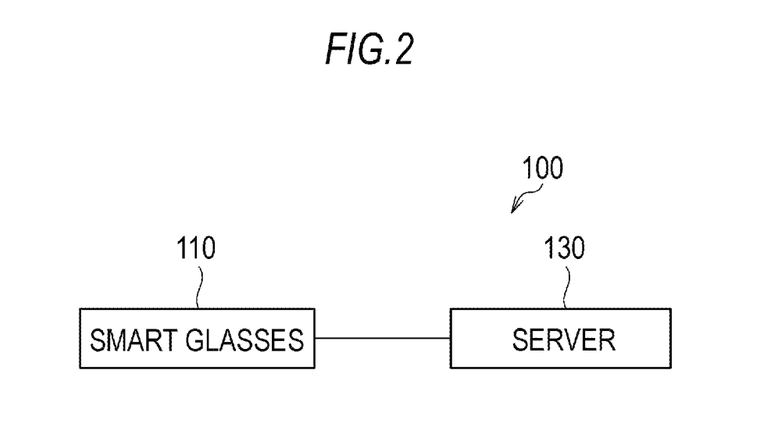
FIG. 2 is a drawing illustrating an example of a configuration of an information processing system.

[Information Processing System]
Next, the following describes an example of the configuration of the information processing system 100 with reference to FIG. 2. FIG. 2 is a drawing illustrating an example of the configuration of the information processing system 100. The information processing system 100 is a system that displays the superimposition screen 150 and includes the smart glasses 110 and a server 130. The smart glasses 110 and the server 130 can be communicated with one another. The worker 10 can wear the smart glasses 110.

Figure 3:
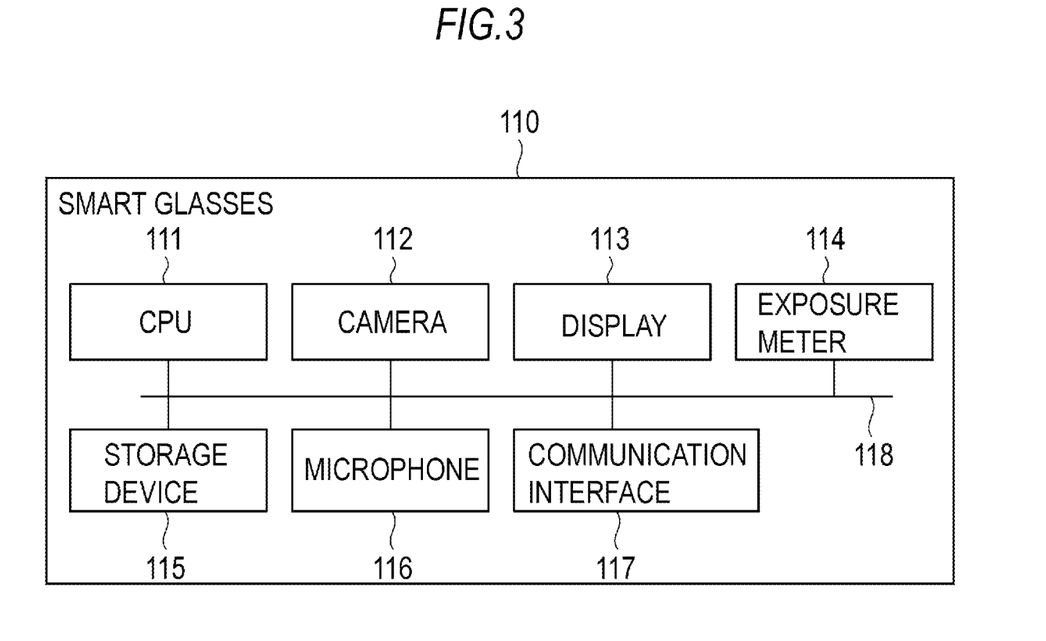
FIG. 3 is a drawing illustrating an example of a hardware configuration of smart glasses.

Next, the following describes an example of a hardware configuration of the smart glasses 110 with reference to FIG. 1 and FIG. 3. FIG. 3 is a drawing illustrating an example of the hardware configuration of the smart glasses 110.

The smart glasses 110 are an example of an information processing device and a computer that include a CPU 111, a camera 112, a display 113, an exposure meter 114, a storage device 115, a microphone 116, a communication interface 117, and a bus 118 that couples these devices together.

The CPU 111 controls the whole smart glasses 110. Execution of a process based on a program stored in the storage device 115 or similar device by the CPU 111 achieves processes shown in FIG. 6 or similar process.

The camera 112 is a photographing device that photographs a subject to generate a photographed image. The camera 112 photographs the subject at an F-number, an ISO brightness, and a shutter speed set by a control by the CPU 111. The camera 112 includes a lens and an imaging element. The imaging element converts an incident light from the lens into an electrical signal. As the imaging element, a CCD imaging element, a CMOS imaging element, or similar device is used.

The display 113 is a display device to achieve an Augmented Reality (AR). Based on the control by the CPU 111, the display 113 superimposes an AR image 152 corresponding to the marker 210 on a real image of a real space including the marker 210 and displays the superimposed image.

The display 113 of this embodiment is a video see-through type. In view of this, the above-described real image of the real space is a photographed image 151 photographed by the camera 112. Based on the control by the CPU 111, the display 113 displays the superimposition screen 150 where the AR images 152 described later are superimposed on the photographed image 151 photographed with the camera 112.

Note that the display 113 may be an optical see-through type. The above-described real image of the real space is a real image displayed with an optical system such as a prism and a half mirror when the display 113 is the optical see-through type. In this case, the display 113 transparently displays the real image of the real space. Based on the control by the CPU 111, the display 113 displays the superimposition screen 150 where the AR images 152 described later are superimposed on the real image of the real space transparently displayed with the optical system.

The exposure meter 114 measures a luminance of the subject. The exposure meter 114 may employ a Through-the-Lens (TTL) system or may employ another system.

The storage device 115 is a storage device such as a RAM, a ROM, and an HDD that stores, for example, a program and data used to execute the process based on the program by the CPU 111. The storage device 115 may include a recording medium storing the program. At this time, the execution of the process based on the program stored in the recording medium by the CPU 111 achieves the process illustrated in FIG. 6 or similar process.

The microphone 116 receives a voice of the worker 10 as voice data and outputs the voice.

The communication interface 117 is in charge of a control of communications between the smart glasses 110 and an external device such as the server 130.

Next, the following describes an example of a hardware configuration of the server 130. The server 130 is an example of an information processing device and a computer that includes a CPU, a storage device, a communication interface, and a bus that couples these devices together.

The CPU in the server 130 controls the whole server 130.

The storage device in the server 130 is a storage device such as a RAM, a ROM, and an HDD that stores, for example, a program and data used to execute the process based on the program by the CPU in the server 130. The storage device in the server 130 stores a picking list described later.

The communication interface in the server 130 is in charge of a control of communications between the server 130 and an external device such as the smart glasses 110.

Next, the following describes the picking list. The storage device in the server 130 stores the picking list. In response to a request from the smart glasses 110, the server 130 transmits the picking list to the smart glasses 110.

The picking list is a list of identification IDs of the articles 200 target for the picking by the worker 10 in the warehouse. The identification ID of the article 200 is recorded in the marker 210 attached to the article 200 as information representing the marker 210.

[Superimposition Screen]

Figure 4:
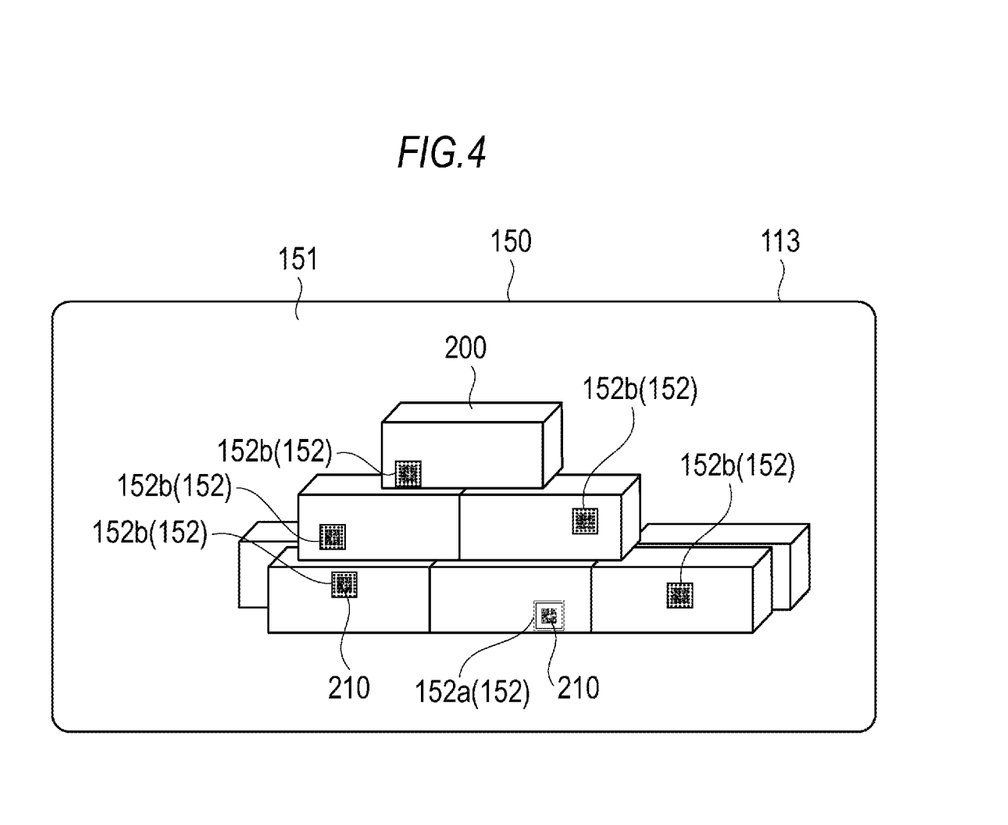
FIG. 4 is a drawing illustrating an example of a superimposition screen.

Next, the following describes the superimposition screen 150 with reference to FIG. 4. FIG. 4 is a drawing illustrating an example of the superimposition screen 150, which is a screen displayed by the display 113 based on the control by the CPU 111 when the worker 10 wearing the smart glasses 110 faces the articles 200 under the environment illustrated in FIG. 1. By the worker 10 facing the articles 200, the camera 112 in the smart glasses 110 also faces the articles 200, thus ensuring photographing the articles 200.

The superimposition screen 150 is a screen that superimposes the AR images 152 corresponding to the markers 210 on the real image of the real space including the markers 210 and displays the superimposed image. The display 113 of this embodiment is the video see-through type. In view of this, the photographed image 151 photographed with the camera 112 is displayed as the real image of the real space.

The photographed image 151 illustrated in FIG. 4 displays the articles 200 to which the markers 210 are attached. The AR images 152 corresponding to the markers 210 are displayed so as to be superimposed on the corresponding markers 210.

The AR image 152 is an example of the imaginary image that includes a first AR image 152a and a second AR image 152b. The first AR image 152a represents that the article 200 to which the marker 210 corresponding to the first AR image 152a is attached is the picking target. The second AR image 152b represents that the article 200 to which the marker 210 corresponding to the second AR image 152b is attached is not the picking target.

The first AR image 152a and the second AR image 152b are different images. For example, the first AR image 152a is a rectangular image filled with a semitransparent green, and the second AR image 152b is a rectangular filled with a semitransparent red.

[Operation Mode: First Mode]

Next, the following describe the operation mode that the smart glasses 110 have. The operation mode that the smart glasses 110 have includes a first mode, a second mode, and a third mode.

First, the following describes the first mode. The first mode is an operation mode in which the photographed image 151 displayed in the superimposition screen 150 is photographed such that the photographed image 151 becomes an image easily viewable for a user such as the worker 10 and the markers 210 can be recognized by the CPU 111. The first mode is, for example, used when the worker 10 performs the picking.

Next, the following describes a default F-number, a default ISO speed, and the luminance of the subject used for the photographing in the first mode.

The default F-number is a predetermined F-number such as an F-number determined in advance defined by an OS and an application provided with the smart glasses 110. Another example of default F-number is an F-number at which an average variation of distances from the worker 10 who wears the smart glasses 110 to the markers 210 attached to the articles 200 falls within a depth of field. The default F-number may be stored in the storage device 115 or may be obtained from the server 130 or similar device by the smart glasses 110.

The default ISO speed is a predetermined ISO speed at which the photographed image 151 that can be visually perceived by a person can be photographed and the photographed image 151 with which the CPU 111 can recognize the markers 210 can be photographed.

Here, the following describes a relationship between the ISO speed and the shutter speed (exposure period). It has been newly found this time that the AR images can be stably displayed with the shortened shutter speed. It is considered that this occurs because the subject (for example, the marker 210 target for the superimposition with the AR image) can be fixedly photographed without blur in respective frames constituting a captured moving image. However, too shortened shutter speed causes a fail of obtaining a sufficient amount of exposure and possibly makes it difficult to recognize the markers 210 in the photographed image 151 by the CPU 111. In this case as well, by setting the ISO speed of the imaging element high, the subject can be photographed to be recognizable even with the small amount of exposure. Accordingly, from an aspect of stably displaying the AR images, the shutter speed is set to be higher (namely, the short exposure period).

Meanwhile, even when the CPU 111 can recognize the markers 210 in the photographed image 151, excessively high ISO speed generates a noise in the photographed image 151. Since this makes it difficult for a person who wears the smart glasses 110 and performs the work to visually perceive the photographed image 151, the ISO speed included in an appropriate range is used as the default ISO speed. The default ISO speed may be stored in the storage device 115 or may be obtained from the server 130 or similar device by the smart glasses 110. In this embodiment, the default ISO speed is set to be 400 or more to 3200 or less. This reason will be described later.

The exposure meter 114 measures the luminance of the subject. The exposure meter 114 is not limited to dedicated hardware and, for example, the CPU 111 may analyze an image photographed by the camera 112 to calculate the luminance of the subject. That is, it is obvious that a program for luminance measurement stored in the storage device 115 may cause the imaging element constituting the camera 112 and the CPU 111 to function as the exposure meter 114.

Next, the following describes a relationship between the F-number, the luminance of the subject, the shutter speed, the ISO speed, and an exposure value.

This embodiment assumes that the F-number, the luminance of the subject, the shutter speed, and the ISO speed meet a condition of meeting the following Formula (1).

$$K = L \cdot t \cdot S / N^2 \quad (1)$$

K: constant
L [cd/m^2]: luminance of subject
t [sec]: shutter speed
S [-]: ISO speed
N [-]: F-number Here, the constant K is a calibration constant of the exposure meter 114 and a value typically set such that the subject is finished at a medium density (gray with a reflectance around 18%) relative to the sensitivity of the imaging element (for example, a CCD imaging element). A value roughly around 10.6 to 13.4 is set depending on each manufacturer of an imaging device.

Formula (1) can be modified like the following Formula (2).

$$N^2/t = L \cdot S/K \quad (2)$$

The right side of Formula (2) can be expressed as the following Formula (3) using a conversion factor A.

$$N^2/t = L \cdot S \cdot A/(K \cdot A) \quad (3)$$

When taking logarithms of both sides of Formula (3) with the base of 2, the following Formula (4) is obtained.

$$\log_2(N^2) + \log_2(1/t) = \log_2(L/(K \cdot A)) + \log_2(S \cdot A) \quad (4)$$

Here, an AV value, a TV value, a BV value, and an SV value are defined by the following Formula (5) to Formula (8). Formula (5) to Formula (8) are generally referred to as an APEX relational expression.

$$AV = \log_2(N^2) \quad (5)$$

$$TV = \log_2(1/t) \quad (6)$$

$$BV = \log_2(L/(K \cdot A)) \quad (7)$$

$$SV = \log_2(S \cdot A) \quad (8)$$

Formula (4) to Formula (8) define an EV value as the exposure value as follows.

$$AV + TV = BV + SV = EV \quad (9)$$

From Formula (9), the EV value can be expressed as the following Formula (10) and Formula (11).

$$EV = AV + TV \quad (10)$$

$$EV = BV + SV \quad (11)$$

To convert an ISO speed S into the SV value, the conversion factor A is a constant set according to the ISO speed such that the conversion into a logarithm with the base of 2 produces the integer SV value. For example, to set such that the ISO speed S=100 becomes SV=5, A=0.32.

Figure 5:
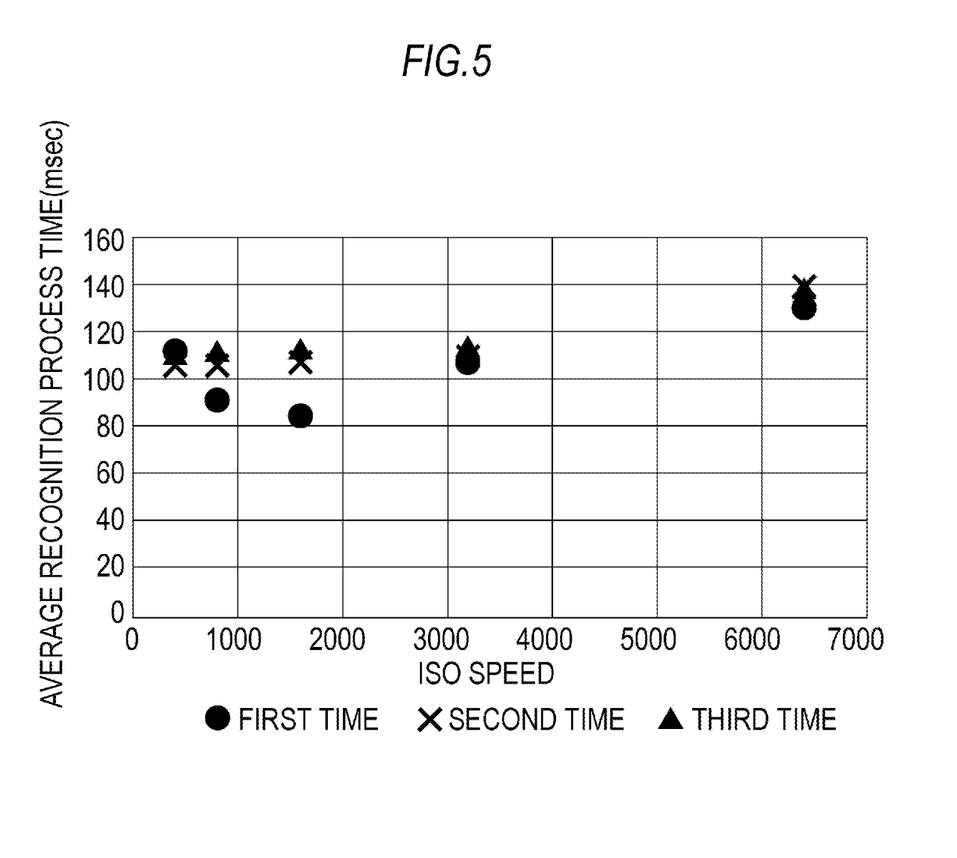
FIG. 5 is a drawing illustrating a recognition process time graph.

Next, the following describes the reason that the default ISO speed is set to be 3200 or less in this embodiment with reference to FIG. 5. FIG. 5 is a drawing illustrating a recognition process time graph. The recognition process time graph is a graph that summarizes results of measurements to determine the default ISO speed. The horizontal axis of the recognition process time graph indicates the ISO speed. The vertical axis of the recognition process time graph indicates an average recognition process time.

The average recognition process time is an average process time in one time when the CPU 111 in the smart glasses 110 executes the process of recognizing the nine markers 210 from a photographed image formed by photographing a paper sheet to which the nine markers 210 are attached at the ISO speeds indicated in the horizontal axis of the recognition process time graph by 100 times.

To determine the default ISO speed, the average recognition process time was measured by three times at the respective ISO speeds 400, 800, 1600, 3200, and 6400.

As the shutter speed, t [sec] determined so as to meet Formula (1) was used. Note that S in Formula (1) is the ISO speed any of 400, 800, 1600, 3200, and 6400 in the measurements of FIG. 5.

As seen from FIG. 5, with the ISO speed of 6400, the average recognition process time increases by around 1.3 times compared with the other cases. With the ISO speed of 6400, it was confirmed that a noise in the photographed image increased compared with the other cases. It is considered that the average recognition process time increased due to the increase in noise. When the ISO speed at which the average recognition process time increases is set as the default ISO speed, a load on the CPU 111 increases and the superimposition screen 150 is not smoothly displayed, possibly making the display of the superimposition screen 150 jumpy.

In view of this, to reduce the noise in the photographed image, reduce the increase in load on the CPU 111, and prevent the display of the superimposition screen 150 from becoming jumpy, the ISO speed is preferably set to be 3200 or less.

Next, the following describes a reason that the default ISO speed is set to be 400 or more in this embodiment with reference to Table 1.

TABLE 1

| ISO SPEED | 3200 | 1600 | 800 | 400 | 200 | 100 |
|---|---|---|---|---|---|---|
| SHUTTER SPEED | 1/1600 | 1/800 | 1/400 | 1/200 | 1/100 | 1/50 |
| QR READABILITY | EXCELLENT | EXCELLENT | EXCELLENT | EXCELLENT | POOR | POOR |

Table 1, shows results measurements of readability of a QR code by the glasses 110 in each combination of the ISO speed and the shutter speed of (3200, 1/1600 sec) (1600, 1/800 sec), (800, 1/400 sec), (400, 1/200 sec), (200, 1/100 sec), and (100, 1/50 sec).

The readability of the QR code was measured under an illuminance in a general warehouse while the smart glasses 110 were moved parallel in a horizontal direction with respect to a wall at a distance away from about 1 m in a direction perpendicular to the wall on which the QR code was put at a speed per hour of 2.5 km. This situation is approximately similar to a situation where the worker reads the QR code attached to a commodity and the like with the smart glasses 110 or similar device carried by the worker in the warehouse work. The QR code is an example of the marker 210.

As shown is n Table 1, the reading of the OR codes failed in the combinations of the ISO speeds and the shutter speeds of (200, 1/100 sec) and (100 1/50 sec). This means that, in the case where the worker who wears the smart glasses 110 performs a work in the warehouse, the shutter speed of the smart glasses 110, namely, the exposure period of 1/100 (sec) or more falls to read the OR code attached commodity and the like. Accordingly, in this case, setting the shutter speed high 1/200 (sec) (namely, the short exposure period) is preferred. Setting 400, the minimum ISO speed allowable at this shutter speed under the illuminance of the general warehouse, as the lower limit value is preferred.

Because of the above-described reasons, the default ISO speed of this embodiment is set to be 400 or more to 3200 or less.

Figure 6:
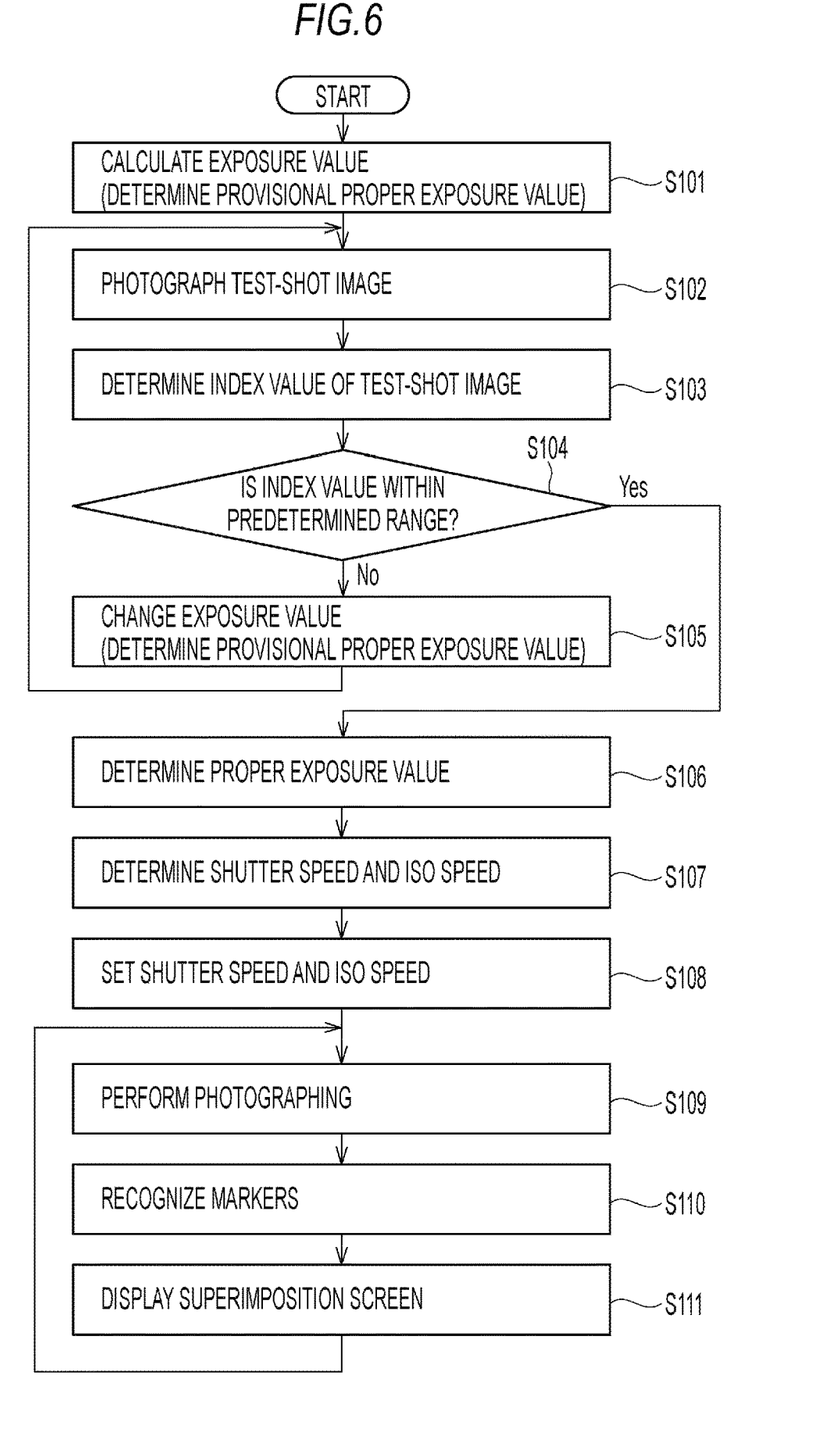
FIG. 6 is a flowchart for a superimposition screen display process in a first mode.

Next, the following describes a superimposition screen display process in the first mode with reference to FIG. 6. FIG. 6 is a flowchart of the superimposition screen display process in the first mode. The superimposition screen display process is a process of displaying the superimposition screen 150 by the smart glasses 110. Assume that the CPU 111 controls the communication interface 117 and obtains the picking list from the server 130 in advance.

At S101, the CPU 111 calculates the exposure value corresponding to the current setting of the camera 112. Assume that, in the first mode, the F-number of the camera 112 is the default F-number and the ISO speed of the camera 112 is the default ISO speed. At S101, assume that the shutter speed of the camera 112 is set to a predetermined shutter speed. At this time, the CPU 111 calculates the exposure value based on the luminance of the subject obtained from the exposure meter 114, the default ISO speed, and Formula (11). The CPU 111 determines a provisional proper exposure value as the calculated exposure value.

The proper exposure value is a proper exposure value fixed according to the usage environment of the smart glasses 110. The CPU 111 executes an exposure correction by the processes from S102 to S106 and determines the proper exposure value.

At S102, the camera 112 performs the photographing based on a photographing control by the CPU 111 to generate a test-shot image. The CPU 111 obtains the test-shot image. When a still image and a moving image are photographed using, for example, camera functions of a digital camera and a smart device, turning on the camera function and holding the subject over the camera displays an image of the subject captured via the CCD imaging element or similar device in displays of the digital camera and the smart device. This is one example of the test-shot image.

At S103, the CPU 111 determines an index value indicative of a visual property of the test-shot image obtained the most recent.

The CPU 111 defines a value found by integrating luminance signal levels of the test-shot image and averaging the luminance levels as the index value. The CPU 111 may define a value found by weighting the center of the screen of the test-shot image and integrating the luminance signal levels as the index value. The CPU 111 may define a value determined by dividing the screen of the test-shot image into a plurality of areas and integrating the luminance signal levels of each area as the index value. The CPU 111 may define a value determined based on a histogram of the luminance signal levels of the test-shot image as the index value. For example, Japanese Laid-open Patent Publication No. 2-250472 discloses a configuration that performs an exposure correction based on a histogram of luminance signals.

At S104, the CPU 111 judges whether the most recent index value determined at S103 is included in the preset proper predetermined range or not. When the most recent index value determined at S103 is included in the predetermined range, the CPU 111 advances the process to S106. When the index value is not included, the CPU 111 advances the process to S105.

The predetermined range used at S104 may be, for example, based on an index value determined from a sample image photographed with the camera 112 in a proper exposure state in advance. The sample image and the test-shot image are preferably formed by photographing the identical or similar subject. An example of the subject is a board where a QR code is put on a corrugated cardboard. This board is one example of the subject. The QR code is not necessarily to be always included, and it is freely determined according to the property of the subject at each work place. The predetermined range used at S104 is a range having a predetermined size around the index value determined from the sample image.

At S105, the CPU 111 increases the exposure value of the camera 112 by one level and decreases the exposure value by one level to change the exposure value of the camera 112. The CPU 111, for example, changes the shutter speed of the camera 112 to change the exposure value of the camera 112. At this time, the CPU 111 sets the camera 112 such that the test-shot image is photographed with the F-number (N) as the default F-number and the exposure value after change as the EV value and using the shutter speed (t) calculated from Formulae (5), (6), and (10). The CPU 111 determines the provisional proper exposure value as the exposure value after change. Afterwards, the CPU 111 returns the process to S102.

At S106, the CPU 111 determines the provisional proper exposure value determined the most recent as the settled proper exposure value.

The CPU 111 may preliminarily store an optimal index value based on the sample image in the storage device 115 and determine an exposure value when a test-shot image closest to the optimal index value has been photographed among the index values calculated from the test-shot images photographed while the exposure values were changed in phases as the proper exposure value.

At S107, the CPU 111 determines the shutter speed and the ISO speed meeting a condition that the exposure value corresponding to the default F-number, the luminance of the subject, the shutter speed, and the ISO speed becomes the proper exposure value determined at S106. Next, the following describes methods for determining the shutter speed and the ISO speed.

First, the following describes a first determination method. The CPU 111 determines the ISO speed as the default ISO speed. Additionally, the CPU 111 determines the shutter speed based on the default F-number and the proper exposure value. More specifically, the CPU 111 calculates the default F-number (N) and the AV value from Formula (5). Next, the CPU 111 calculates the TV value from the EV value to which the proper exposure value is assigned, the calculated AV value, and Formula (10) to determine the shutter speed (t) from Formula (6).

Next, the following describes a second determination method. The CPU 111 determines the ISO speed as the default ISO speed. The CPU 111 determines the luminance of the subject based on the default ISO speed and the proper exposure value, and determines the shutter speed based on the determined luminance of the subject, the default ISO speed, and the default F-number. More specifically, the CPU 111 calculates the SV value from the default ISO speed (S) and Formula (8). Next, the CPU 111 calculates the BV value from the EV value to which the proper exposure value is assigned, the calculated SV value, and Formula (11), and calculates the luminance (L) of the subject from Formula (7). The luminance (L) of the subject calculated here is the luminance of the subject when the test-shot image is photographed. Next, the CPU 111 determines the shutter speed (t) from the calculated luminance (L) of the subject, the default ISO speed (S), the default F-number (N), and Formula (1).

At S102 of FIG. 6, the image is photographed at the shutter speed meeting the default F-number, the default ISO speed, and Formula (1). Accordingly, when the process proceeds to S107, the CPU 111 may determine the shutter speed used for the most recent photographing at S102 as the shutter speed used for the subsequent photographing.

Next, the following describes a third determination method. While the first determination method and the second determination method set the ISO speed as the default ISO speed, the third method can set a value other than the default ISO speed to the ISO speed.

First, the CPU 111 determines the luminance of the subject based on the proper exposure value and the default ISO speed. More specifically, the CPU 111 calculates the SV value from the default ISO speed and Formula (8). Next, the CPU 111 calculates the BV value from the EV value to which the proper exposure value is assigned, the calculated SV value, and Formula (11), and calculates the luminance (L) of the subject from Formula (7). The luminance (L) of the subject calculated here is the luminance of the subject when the test-shot image is photographed. Next, the CPU 111 calculates C from the calculated luminance (L) of the subject, the default F-number (N), and the following Formula (12). Next, the CPU 111 determines the shutter speed (t) and the ISO speed (S) so as to meet Formula (13).

$$C=(K \cdot N^2)/L \qquad (12)$$

$$t=C/S \qquad (13)$$

Here, the following describes Formula (12) and Formula (13). Formula (1) can be modified as follows.

$$t=(1/S)\times(K \cdot N^2)/L \qquad (14)$$

Here, when C is defined with Formula (12), Formula (13) is obtained from Formula (14). N included in C is the default F-number, and L is the luminance fixed relative to the proper exposure value and is the luminance L of the subject determined by the third determination method. Accordingly, C becomes a constant.

Since C is thus the constant, when any one of F-numbers of the ISO speed (S) and the shutter speed (t) is fixed in Formula (13), the other value is fixed. As described above, the ISO speed preferably has the value of 400 or more to 3200 or less (referred to as a proper ISO range).

In the use of the third determination method, settable values of the ISO speed are prepared in phases in advance within the proper ISO range (for example, the ISO speeds of 400, 800, 1600, and 3200). A plurality of setting modes such as: an image quality priority mode that selects the low ISO speed as much as possible while having a priority in image quality, a reading mode that selects the high ISO speed as much as possible while having a priority in the high shutter speed setting, and a balance mode that selects a value close to the intermediate value among the prepared ISO speeds are prepared in advance. The user selects the setting mode and the CPU 111 stores information on the selected setting mode in the storage device 115.

The CPU 111 determines the shutter speed (t) from the ISO speed (S) corresponding to the setting mode, the calculated constant C, and Formula (12). For example, with the image quality priority mode selected, the CPU 111 determines the minimum value among the settable ISO speeds as the ISO speed (S) and determines a value corresponding to the selected ISO speed "C/S" as the shutter speed (t).

While the configuration that prepares the settable values of the ISO speed in phases has been described here as an example, the configuration may be able to set any value within the proper ISO range and therefore is not especially limited.

A program control of a general auto exposure function automatically determines a combination of a diaphragm and the shutter speed with a program according to a photographing scene. It is important for a warehouse work assistance using the AR images to keep a balance between ensuring stably superimposing and displaying the AR images (that is, stably reading the QR codes) and the image quality presented to the worker via the smart glasses or similar device. That is, even when the image is stably read enough, the worker needs to perform the work while seeing the image through the smart glasses, and continuing the work while seeing the poor image for a long time is a pain for the worker. Even with the identical image quality, whether the worker feels a pain or not depends on the subjective view of the individual worker; therefore, it is preferred that the combination of the ISO speed and the shutter speed is flexibly and easily settable.

Photographing the image with the shutter speed and the ISO speed determined by the first to the third determination methods allows photographing the photographed image 151 that can be visually perceived by a person free from stress even under an environment where an amount of light is different and the photographed image 151 from which the markers 210 can be recognized by the CPU 111.

At S108, the CPU 111 sets a photographing condition in the first mode. More specifically, the CPU 111 sets the camera 112 such that the camera 112 performs photographing using the default F-number, and the shutter speed and the ISO speed determined at S108.

At S109, the camera 112 performs the photographing to generate the photographed image 151 based on the photographing control by the CPU 111.

At S110, the CPU 111 recognizes the markers 210 from the photographed image 151 generated at S109.

At S111, the CPU 111 executes a display control that displays the superimposition screen 150 described with reference to FIG. 4 in the display 113. At this time, the CPU 111 changes the AR image 152 corresponding to the marker 210 based on whether the identification ID of this marker 210 recognized at S110 is included in the picking list or not. More specifically, when the identification ID of the marker 210 recognized at S110 is included in the picking list, the CPU 111 configures the AR image 152 corresponding to this marker 210 as the first AR image 152a. When the identification ID of the marker 210 recognized at S110 is not included in the picking list, the CPU 111 configures the AR image 152 corresponding to this marker 210 as the second AR image 152b.

Afterwards, the CPU 111 returns the process to S109. The CPU 111 may return the process to S101. The CPU 111 may return the process to S101 at every predetermined period or when a predetermined condition, for example, when the amount of light in the warehouse changes is met.

The superimposition screen display process in the first mode has been described above.

[Operation Mode: Second Mode]

Next, the following describes the second mode included in the operation mode that the smart glasses 110 have. The second mode is an operation mode appropriate for the recognition of the markers 210 as the color codes when the color codes (color change identifiers) that store information by an arrangement of colors are used as the markers 210. The above-described color bits are an example of the color codes.

The second mode is used, for example, when the smart glasses 110 guide the worker 10 to a place where the article 200 as the picking target is stored. In the case where the smart glasses 110 guide the worker 10, when the camera 112 photographs the shelf storing the article 200 as the picking target, the smart glasses 110 superimpose the AR image indicative of the shelf storing the article 200 as the picking target on the photographed image 151 in the superimposition screen 150 and displays the superimposed image.

Assume that the color codes are attached to a passage side of the shelf.

Next, the following describes the shutter speed in the second mode. Different from the first mode, the shutter speed in the second mode uses a default shutter speed. The default shutter speed is a predetermined shutter speed appropriate for photographing the color codes. For example, the default shutter speed is a shutter speed determined in advance defined (or set by the user) by the OS and the application provided with the smart glasses 110 and a shutter speed obtained by the auto exposure (AE) function that the smart glasses 110 have. Values appropriate for the second mode are set to the default F-number and the default ISO speed according to the default shutter speed. For example, the storage device 115 stores the default shutter speed, the default F-number, and the default ISO speed in the second mode.

Next, the following describes the superimposition screen display process in the second mode. Here, the following mainly describes points different from the superimposition screen display process in the first mode illustrated in FIG. 6.

In the second mode, instead of S101 to S108 of FIG. 6, the CPU 111 executes a process to set a photographing condition for the second mode. More specifically, the CPU 111 executes the following processes. First, the CPU 111 obtains the default F-number, the default ISO speed, and the default shutter speed in the second mode from the storage device 115, the server 130, or similar device. Next, the CPU 111 sets the camera 112 such that the camera 112 performs the photographing using the default F-number, the default ISO speed, and the default shutter speed.

At S111, the CPU 111 executes a control that displays the superimposition screen 150 described with reference to FIG. 4 in the display 113. At this time, when the shelf that stores the article 200 as the picking target is photographed in the photographed image 151, the CPU 111 superimposes the AR image indicative of the shelf storing the article 200 as the picking target on the shelf photographed in the photographed image 151 and displays the superimposed image.

[Operation Mode: Third Mode]

Next, the following describes the third mode included in the operation mode that the smart glasses 110 have. The third mode is an operation mode used to recognize the many markers 210 at a time. The third mode is used, for example, when the many markers 210 are attached to the one article 200 and to scan the many markers 210 for registration of warehousing acceptance when a large amount of articles 200 to which the markers 210 are attached are warehoused.

Next, the following describes the shutter speed in the third mode. A shutter speed faster than the shutter speed determined by the CPU 111 in the first mode is used as the shutter speed in the third mode. Under a condition that the CPU 111 can recognize the markers 210 from the photographed image 151, the shutter speed in the third mode is preferably the fastest shutter speed. Values appropriate for the third mode are set to the default F-number and the default ISO speed according to the default shutter speed. The shutter speed, the default F-number, and the default ISO speed in the third mode may be stored in the storage device 115 or may be obtained from the server 130 or similar device by the smart glasses 110.

Thus, the shutter speed in the third mode is faster than the shutter speed determined by the CPU 111 in the first mode. Accordingly, even when the worker 10 moves the camera 112 fast to scan the many markers 210, the CPU 111 can recognize the markers 210 from the photographed image 151 photographed with the camera 112. Especially, with the monochrome markers 210, the CPU 111 needs not to discriminate the colors and the markers 210 are recognizable from the shading of the colors; therefore, the CPU 111 can accurately recognize the markers 210 even at the fast shutter speed. Since the shutter speed is fast, the photographed image 151 does not always become the photographed image 151 appropriate for visual perception by a person. Therefore, the superimposition screen 150 using the photographed image 151 is not displayed in the third mode in this embodiment.

Next, the following describes a marker recognition process in the third mode.

The marker recognition process in the third mode does not control the display of the superimposition screen 150 in the display 113 but executes a process to recognize the markers 210 from the photographed image photographed with the camera 112 by the CPU 111.

First, the CPU 111 sets a photographing condition in the third mode. More specifically, the CPU 111 executes the following processes. First, the CPU 111 obtains the default F-number, the default ISO speed, and the shutter speed in the third mode from the storage device 115, the server 130, or similar device. Next, the CPU 111 sets the camera 112 such that the camera 112 performs the photographing using the default F-number, the default ISO speed, and the shutter speed in the third mode.

Next, the camera 112 performs the photographing based on the photographing control by the CPU 111 to generate the photographed image 151.

Next, the CPU 111 recognizes the markers 210 from the photographed image 151 and displays the result of recognition in the display 113 and transmits the result to the server 130.

The marker recognition process in the third mode has been described above. The CPU 111 repeats the marker recognition process in the third mode.

[Operation Mode Change]

Next, the following describes the operation mode change.

The CPU 111 may change the operation mode based on an operation received by an input device that receives an input by the user such as the worker 10. The input device is an example of a receiver. When the CPU 111 fails to recognize the markers 210 from the photographed image 151 in the first mode, the CPU 111 may change the mode to the second mode. That is, the CPU 111 may change the mode to the second mode in which the shutter speed is set appropriate for reading the color codes based on an error code and the like, which is output when the CPU 111 attempting to execute the reading process of the color codes with an application program fails to recognize the color codes.

Assume that the process by the smart glasses 110 includes a first phase that guides the worker 10 to the shelf as the work target and a second phase that checks the picking work by the worker 10, the first phase needs to read the color codes put on the shelf, and the second phase needs to read the QR codes put on the commodity and the like. At this time, the CPU 111, for example, can discriminate whether the process is in the first phase or the second phase from a voice input to the microphone 116 by the worker 10. More specifically, when the worker 10 performs the voice input like "I'm going!" based on a voice input item determined in advance in the information processing system 100, the CPU 111 discriminates that the process is in the first phase where the guide to the work place is required. When the worker 10 performs the voice input like "Arrived at the work place!" when arriving at the shelf, the CPU 111 can discriminate that the first phase has terminated and the process is in the second phase. Therefore, the CPU 111 may change the mode to the first mode under the discrimination as the first phase and may change the mode to the second mode under the discrimination as the second phase.

When the CPU 111 recognizes the monochrome markers 210 equal to or more than a predetermined count, the CPU 111 may change the mode to the third mode.

Effects

As described above, in the first mode, the CPU 111 determines the shutter speed and the ISO speed meeting the condition that the exposure value corresponding to the default F-number, the luminance of the subject, the shutter speed, and the ISO speed becomes the predetermined exposure value. The CPU 111 recognizes a target object from the photographed image photographed using the default F-number, and the shutter speed and the ISO speed determined by the CPU 111. Accordingly, the CPU 111 can recognize the markers 210 from the photographed image 151 without executing a special process on the photographed image 151. This does not cause an excessive process load on the CPU 111. In view of this, the AR images 152 can be stably displayed preventing the delay in response.

In the first mode, the CPU 111 determines the shutter speed and the ISO speed by any of the above-described first to third determination methods. Accordingly, the photographed image 151 is suitable for visual perception by a person and also suitable for recognition of the markers 210 by the CPU 111. Accordingly, the smart glasses 110 can display the superimposition screen 150 including the photographed image 151 appropriate for visual perception by a person and can reduce a display omission of the AR image 152. Even the optical see-through type display 113 provides the effect of ensuring reducing the display omission of the AR image 152.

The default ISO speed is 400 or more to 3200 or less. Accordingly, as described with reference to FIG. 5, the increase in load on the CPU 111 can be reduced and further the noise in the photographed image 151 can be reduced. As described with reference to Table 1, the CPU 111 can stably recognize the markers 210.

The smart glasses 110 have a plurality of operation modes including the first mode.

Accordingly, the CPU 111 can appropriately recognize the markers 210 from the photographed image 151 according to the usage environment, the purpose of use, and the like.

Especially, the operation mode includes the second mode. Accordingly, setting the second mode allows the CPU 111 to appropriately recognize the markers 210 from the photographed image 151 even when the markers 210 are the color codes.

Furthermore, the operation mode includes the third mode. Accordingly, setting the third mode allows the CPU 111 to scan the many markers 210 especially even with a large amount of monochrome markers 210.

Other Embodiments

The operation mode only needs to include the first mode and needs not to include the second mode and the third mode. The operation mode may include a mode other than the second mode and the third mode.

Additionally, the user of the smart glasses 110 such as the worker 10 may be able to set the default F-number and the default ISO speed in the respective operation modes and the shutter speed in the second mode and the third mode.

The processes illustrated in FIG. 6 are not limited to the configuration executed by one pair of the smart glasses 110 and may be decentrally executed by a plurality of information processing devices. For example, the smart glasses 110 may only photograph the photographed image 151 and display the superimposition screen 150 and another information processing device such as the server 130 may execute the other processes. At this time, the smart glasses 110, the server 130, and similar device transmit and receive data via the communication interface 117 to achieve the processes illustrated in FIG. 6.

Instead of the smart glasses 110 constituting the information processing system 100, another information processing device such as a smart phone and a tablet terminal may be used.

The default ISO speed may be an ISO speed at which the CPU 111 can recognize the markers 210 from the photographed image 151 photographed with the camera 112 at the fastest shutter speed.

The present invention is also achievable by the following process. A program that achieves one or more functions of the above-described embodiments is supplied to a system or a device over a network or a storage medium. One or more processors in a computer in the system or the device reads and executes the program. Additionally, the present invention is also achievable by a circuit (for example, ASIC) that achieves the one or more functions.

While the present invention has been described with the embodiments, the above-described embodiments merely describe the specific examples to embody the present invention and therefore the technical scope of the present invention should not be limitedly interpreted. That is, the present invention can be embodied in a variety of configurations without departing from the technical idea or its main feature.

The above-described embodiments may be embodied in any given combination.

The invention claimed is:

1. An information processing device comprising:
    a first determiner configured to:
        determine a shutter speed and an ISO speed meeting a condition that an exposure value corresponding to a default F-number, a luminance of a subject, the shutter speed, and the ISO speed becomes a predetermined exposure value;
        determine the ISO speed as a default ISO speed;
        determine the luminance of the subject based on the default ISO speed and the predetermined exposure value;
        determine the shutter speed based on the determined luminance of the subject, the default ISO speed, and the default F-number; and
    a recognizer configured to recognize a target object from a photographed image, the photographed image being photographed using the default F-number, and the shutter speed and the ISO speed determined by the first determiner.

2. The information processing device according to claim 1, further comprising:
    a first obtainer configured to obtain test-shot images, the test-shot images having been photographed while changing the exposure value; and
    a second determiner configured to determine an exposure value when the test-shot image meeting a condition is photographed as the predetermined exposure value, the condition being that an index value indicative of a visual property is included in a predetermined range.

3. The information processing device according to claim 1, wherein
    the first determiner is configured to:
        determine the ISO speed as a default ISO speed; and
        determine the shutter speed based on the default F-number and the predetermined exposure value.

4. The information processing device according to claim 3, wherein the default ISO speed is 400 or more to 3200 or less.

5. The information processing device according to claim 1, wherein
    the first determiner is configured to:
        determine the luminance of the subject based on the predetermined exposure value and a default ISO speed; and
        determine the shutter speed and the ISO speed so as to meet the following formula, $$K = L \cdot t \cdot S / N^2$$

K: constant
L [cd/m^2]: luminance of subject
t [sec]: shutter speed
S [-]: ISO speed
N [-]: F-number.

6. The information processing device according to claim 1, further comprising
    a photographing controller configured to control a photographing device so as to perform photographing using the default F-number, and the shutter speed and the ISO speed determined by the first determiner.

7. The information processing device according to claim 1, further comprising
    a display controller configured to perform a control that superimposes an imaginary image corresponding to the target object recognized by the recognizer on the photographed image, the display controller being configured to cause a display device to display the superimposed image.

8. The information processing device according to claim 7, further comprising
    a second obtainer configured to obtain a list of information indicative of the target object, wherein
    the display controller is configured to change the imaginary image corresponding to the target object based on whether the target object recognized by the recognizer is included in the list or not.

9. The information processing device according to claim 7, wherein
    the display controller is configured to perform a control that displays the imaginary image such that the imaginary image corresponding to the target object is superimposed on the target object.

10. The information processing device according to claim 1, further comprising
a display controller configured to perform a control that superimposes an imaginary image corresponding to the target object recognized by the recognizer on a real image of a real space, the display controller being configured to cause a display device to display the imaginary image, the display device being configured to transmit the real image of the real space including the target object and display the imaginary image.

11. The information processing device according to claim 1, wherein
the target object is an optically readable code.

12. The information processing device according to claim 1, comprising
a plurality of operation modes including a first mode, wherein the recognizer is configured to:
recognize the target object from the photographed image photographed using the shutter speed and the ISO speed determined by the first determiner in the first mode; and
recognize the target object from the photographed image photographed using an F-number, the ISO speed, and the shutter speed according to the operation mode in the operation mode other than the first mode.

13. The information processing device according to claim 12, wherein
the operation mode includes a second operation mode, and
the recognizer is configured to recognize the target object from the photographed image photographed using a second default F-number, a second default ISO speed, and a default shutter speed in the second operation mode.

14. The information processing device according to claim 12, wherein
the operation mode includes a third operation mode, and
the recognizer is configured to recognize the target object from the photographed image photographed using a third default F-number, a third default ISO speed, and the shutter speed in the third operation mode, and the shutter speed is faster than the shutter speed determined by the first determiner.

15. The information processing device according to claim 12, further comprising
a change unit configured to change the operation mode based on a result of the recognition by the recognizer.

16. The information processing device according to claim 12, further comprising
a change unit configured to change the operation mode based on an operation received by a receiver configured to receive the operation.

17. An information processing method comprising:
a first determining step of determining a shutter speed and an ISO speed meeting a condition that an exposure value corresponding to a default F-number, a luminance of a subject, the shutter speed, and the ISO speed becomes a predetermined exposure value, determining the ISO speed as a default ISO speed, determining the luminance of the subject based on the default ISO speed and the predetermined value, and determining the shutter speed based on the determined luminance of the subject, the default ISO speed, and the default F-number; and
a recognizing step of recognizing a target object from a photographed image, the photographed image being photographed using the default F-number, and the shutter speed and the ISO speed determined by the first determining step.

18. A non-transitory computer-readable recording medium that records a program to cause a computer to function as:
a first determiner configured to determine a shutter speed and an ISO speed meeting a condition that an exposure value corresponding to a default F-number, a luminance of a subject, the shutter speed, and the ISO speed becomes a predetermined exposure value, determining the ISO speed as a default ISO speed, determining the luminance of the subject based on the default ISO speed and the predetermined value, and determining the shutter speed based on the determined luminance of the subject, the default ISO speed, and the default F-number; and
a recognizer configured to recognize a target object from a photographed image, the photographed image being photographed using the default F-number, and the shutter speed and the ISO speed determined by the first determiner.

* * * * *